No. 663,608. Patented Dec. 11, 1900.
M. E. LYNCH.
APPARATUS FOR MAKING PLASTIC POLYGONAL SHAPED VALVE PACKINGS.
(Application filed Apr. 6, 1900.)
(No Model.)
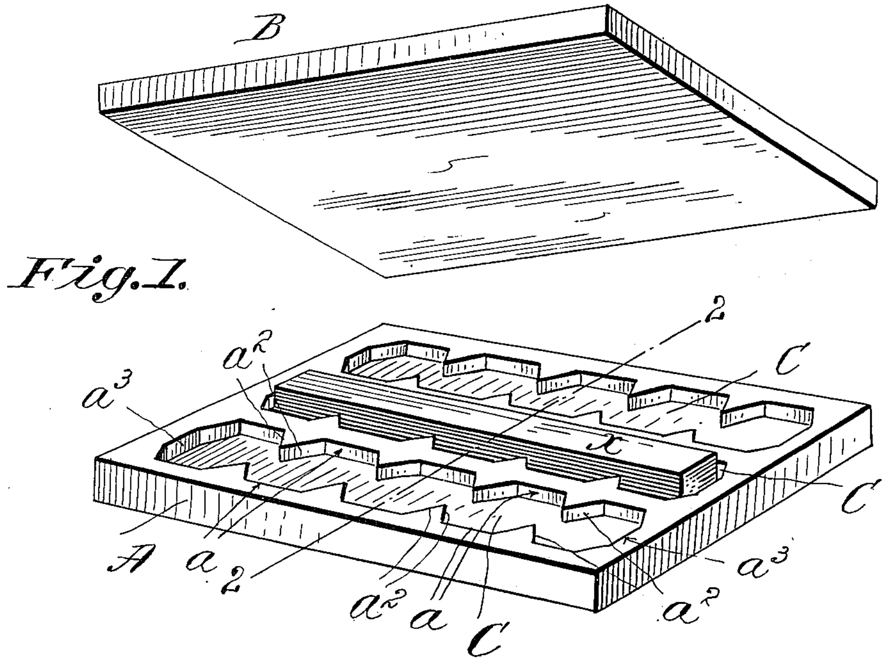
Fig.1.
Fig.2.
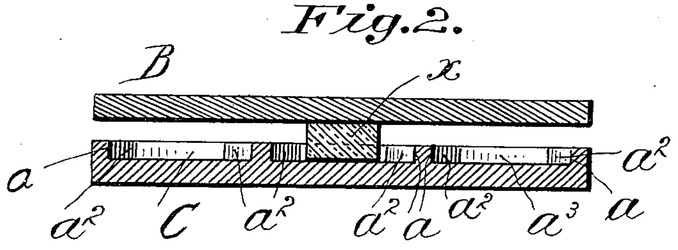
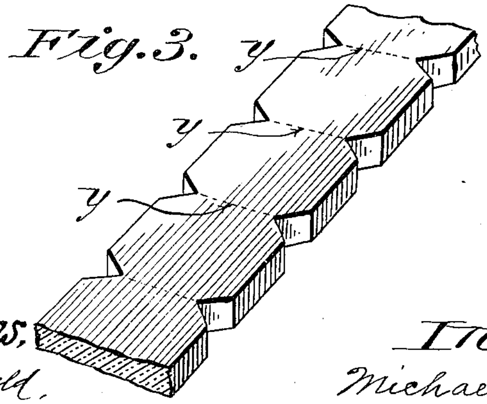
Fig.3.
Fig.4.
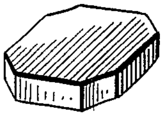
Witnesses.
J. D. Garfield.
A. W. Smith
Inventor
Michael E. Lynch,
by Wm. S. Bellows,
Attorney.
THE NORRIS PETERS CO., PHOTO-LITHO., WASHINGTON, D. C.

UNITED STATES PATENT OFFICE.

MICHAEL E. LYNCH, OF ELIZABETH, NEW JERSEY.

APPARATUS FOR MAKING PLASTIC POLYGONAL-SHAPED VALVE-PACKINGS.

SPECIFICATION forming part of Letters Patent No. 663,608, dated December 11, 1900.

Application filed April 6, 1900. Serial No. 11,841. (No model.)

*To all whom it may concern:*

Be it known that I, MICHAEL E. LYNCH, a citizen of the United States of America, and a resident of Elizabeth, in the county of Union and State of New Jersey, have invented certain new and useful Improvements in Apparatus for Making Plastic Polygonal-Shaped Valve-Packings, of which the following is a full, clear, and exact description.

This invention relates to an apparatus for making polygonal-shaped "disks" or packings for use in steam-valves and other valves.

In an application for Letters Patent of the United States filed by me January 23, 1900, Serial No. 2,503, I have illustrated a valve comprising therein an improved disk-holder in which are applied octagonal packing-disks such as it is the purpose of this invention to produce.

The invention embodies a die having in one member thereof a die-cavity formed with opposite V-shaped projections the apexes of which are separated, and in which cavity may be received a bar or strip of the plastic material from which the mold-strip of disks to be made is entered, said bar or strip having a thickness or height greater than the depth of the molded cavity and having the cross-sectional bulk such that when the upper or coacting flat-faced member of the die is pressed against the recessed member the material which has become susceptible of being molded by the application of heat transmitted thereto through the members of the mold will be compressed and displaced, widening transversely to fill the remainder of the spaces lying between the V-shaped portions of the die-walls at either side of the die-cavity. By the employment of this mold a strip is produced from the plastic packing material which may be any suitable compound of india-rubber or gutta-percha, which strip has in the opposite edges thereof coinciding angular or V-shaped notches or recesses. By severing portions of the strip on transverse lines extending from the apex of the one notch to that of the opposite notch the octagonal plinths, or "disks," as they are termed among valve-makers, are produced and all without any waste of the plastic material.

The means for carrying out the invention are illustrated in the accompanying drawings, in which—

Figure 1 is a perspective view showing the lower or female die having three of the novel-formed die-cavities therein, in the middle one of which is a strip of the plastic material from which a strip for disks is to be produced and showing also the upper die member separated from the lower one. Fig. 2 is a cross-sectional view on line 2 2, Fig. 1. Fig. 3 is a perspective view of a portion of one of the molded strips from which a plurality of disks may be produced by simply severing on the dotted lines. Fig. 4 is a perspective view of one of the disks understood as severed from the strip such as seen in Fig. 3.

Similar characters of reference indicate corresponding parts in all of the views.

In the drawings, A represents the lower or female die, and B represents the upper die. The lower die has a die-cavity C therein, the depth of which corresponds to the thickness of one of the packing-disks to be produced. The die-cavity has the opposite vertical walls $a$ $a$, which are parallel with each other, and at suitable intervals the inwardly-convergent or V-shaped walls $a^2$, the apexes of those at one side being exactly opposite the apexes at the other side. The mold may be as long as the length of the strip desired to be produced and has at the ends of the die-cavity the walls $a^3$, which are right angular to the ones $a$.

While for the purposes of understanding the present invention it is only necessary to particularly describe a die having a single die-cavity in which may be molded a strip having at its opposite edges several of the V recesses or notches, in practice I make the female die with a number of rows of the die-cavities and each of such length as to produce a strip from which to make a dozen, or, perhaps, many more of the disks.

Now into the mold-cavity is placed a bar or strip $x$ of a plastic material, such as employed in the composition of valve-packing disks, which bar or strip is of a width no greater than the distance between the opposite apexes of the convergent walls $a^2$ $a^2$, but which is of a thickness so much greater than the depth of the mold-cavity as to give a cross-sectional bulk in the strip equal to the capacity of the entire mold-cavity, including not only the space in which the strip is at first set, but also the spaces at either side thereof between the several convergent walls $a^2$ $a^2$. The dies are worked in a heated condition, and the strip $x$, having by contact with the die become softened, may be readily compressed and caused to entirely fill the die-cavity, a suitably-powerful press being employed for forcing the separable members of the die, the one, B, closely and solidly against the top of the other, A. The plastic material having been compressed and molded into the form of the strip, such as seen in Fig. 3, requires only, then, for the production of the octagonal disks that it be severed on the lines $y$ $y$, and it will be apparent from the foregoing that there is—due care having been taken that the bulk of the strip $x$ is just sufficient to fill the die-cavity—no waste material, for the entire strip becomes utilized when the same is cut up in the packing-disks.

Having thus described my invention, what I claim, and desire to secure by Letters Patent, is—

A die for the production of an edge-notched strip to be divided without waste into polygonal packings consisting of a female die member A having a die-cavity therein formed with opposite walls $a$, $a$ perpendicular to its bottom and having at intervals the convergent or V-arranged walls $a^2$, $a^2$, the apexes of a series at one side being opposite the apexes of a similar series at the other side, and a flat-faced, coacting die member B, all whereby a straight bar or strip of the material to be molded having a width no greater than the distance between the aforesaid apexes of the opposite convergent die-walls, but having a thickness greater than the depth of the die-cavity, may be placed in, compressed and molded in the die to completely fill said cavity and produce the described edge-notched form of strip, substantially as and for the purpose set forth.

Signed by me at Elizabeth, New Jersey, this 2d day of April, 1900.

MICHAEL E. LYNCH.

Witnesses:
P. J. RYAN,
E. WRIGHT.